US009847672B2

(12) United States Patent
Fallon et al.

(10) Patent No.: US 9,847,672 B2
(45) Date of Patent: Dec. 19, 2017

(54) SYSTEM AND METHOD TO IMPROVE NETWORK RELIABILITY

(71) Applicant: SCHNEIDER ELECTRIC IT CORPORATION, West Kingston, RI (US)

(72) Inventors: Raymond M. Fallon, Galaway (IE); Daniel C. Cohen, Newtonville, MA (US); Noah L. Pendleton, Medford, MA (US); Sarah Jane Hannon, Quin (IE); George Hsia, Taipei (TW); Heidi Sohlberg-Siltanen, Galway (IE)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 185 days.

(21) Appl. No.: 14/739,466

(22) Filed: Jun. 15, 2015

(65) Prior Publication Data

US 2016/0365750 A1    Dec. 15, 2016

(51) Int. Cl.
*G06F 1/00*      (2006.01)
*H02J 9/06*      (2006.01)
(Continued)

(52) U.S. Cl.
CPC  *H02J 9/06* (2013.01); *H02J 3/14* (2013.01); *H02J 9/04* (2013.01); *H04L 43/0817* (2013.01)

(58) Field of Classification Search
CPC .......... H02J 3/14; H04L 43/0817; G06F 1/26
See application file for complete search history.

(56) References Cited

U.S. PATENT DOCUMENTS 7,646,107 B2*  1/2010  Smith .................. H02J 7/0055
                                                   307/11
8,195,215 B2*  6/2012  Marocchi ............... H04W 4/08
                                                   455/519
(Continued)

FOREIGN PATENT DOCUMENTS

EP          1361499 A2    11/2003
WO      2005091460 A2     9/2005
(Continued)

OTHER PUBLICATIONS

Extended European Search Report from corresponding European Application No. 16174265.5 dated Nov. 10, 2016.

*Primary Examiner* — Austin Hicks
(74) *Attorney, Agent, or Firm* — Lando & Anastasi, LLP

(57) ABSTRACT

According to one aspect, embodiments herein provide a power device comprising an input, power circuitry, a plurality of outlets, a network module configured to be coupled to a network, a controller coupled to the plurality of outlets, the power circuitry and the network module, the controller configured to operate the power circuitry to provide output power to the plurality of outlets derived from input power, provide a management interface to a management system via the network module and the network, the management interface configured to allow an operator to provide an indication of a type of equipment coupled to each one of the plurality of outlets, and display, via the management interface, a plurality of network configuration options in a layout based on the indication of the type of equipment coupled to each one of the plurality of outlets provided by the operator.

26 Claims, 12 Drawing Sheets

(51) Int. Cl.
*H04L 12/26* (2006.01)
*H02J 3/14* (2006.01)
*H02J 9/04* (2006.01)

(56) References Cited

U.S. PATENT DOCUMENTS

| | | |
|---|---|---|
| 8,204,990 B1 | 6/2012 | Avery et al. |
| 8,386,809 B2 | 2/2013 | Spitaels et al. |
| 8,476,787 B2 | 7/2013 | Spitaels et al. |
| 8,639,953 B2 | 1/2014 | Spitaels et al. |
| 8,732,602 B2 | 5/2014 | Deokar et al. |
| 2004/0047095 A1* | 3/2004 | Reynolds .................. G06F 1/26 361/62 |
| 2005/0097478 A1* | 5/2005 | Killian .................. G06F 3/0481 715/851 |
| 2009/0013210 A1* | 1/2009 | McIntosh ............ H04L 12/2697 714/4.1 |
| 2010/0244567 A1 | 9/2010 | Brookshire et al. |
| 2010/0250192 A1 | 9/2010 | Deokar et al. |
| 2010/0328849 A1* | 12/2010 | Ewing .................... G06F 1/266 361/622 |
| 2015/0079985 A1* | 3/2015 | Vuchula ................ H04W 48/16 455/435.1 |

FOREIGN PATENT DOCUMENTS

| | | |
|---|---|---|
| WO | 2010110940 A1 | 9/2010 |
| WO | 2014163604 A1 | 10/2014 |

\* cited by examiner

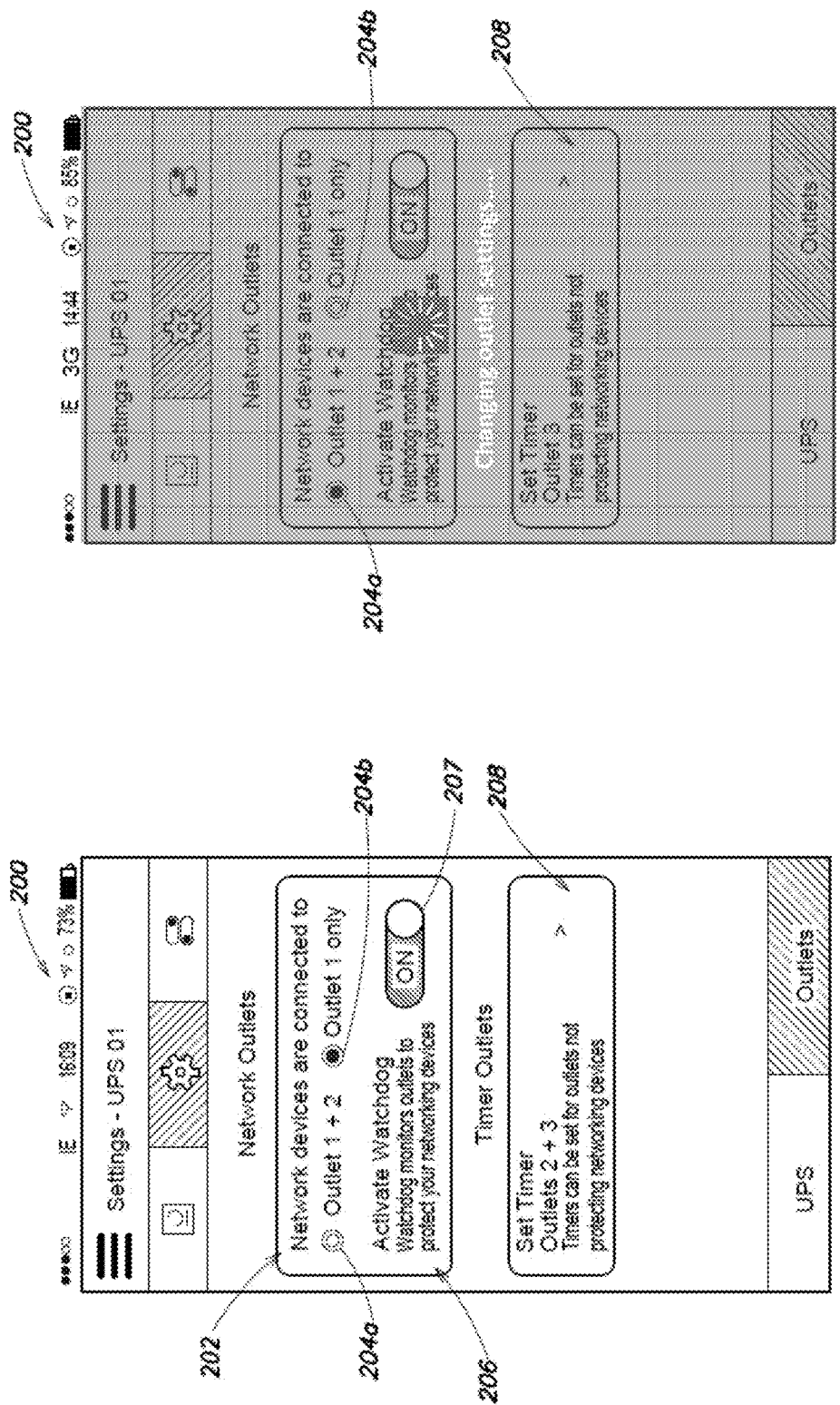

SYSTEM AND METHOD TO IMPROVE NETWORK RELIABILITY

BACKGROUND OF INVENTION

Field of the Invention

At least one example in accordance with the present invention relates generally to the improvement of reliability of network equipment.

Discussion of Related Art

Due to the increased importance of network connectivity and the increased complexity of networks, the impact of inadvertent downtime in a network may be greater than ever. Customers commonly utilize backup power devices to provide power to network equipment (e.g., servers, routers, switches, etc.) to increase the availability of the equipment. For example, Uninterruptible Power Supplies (UPS) are commonly used to provide regulated, uninterrupted power to sensitive and/or critical loads, such as network equipment. In a typical UPS, a battery is used to provide backup power for a critical load during blackout or brownout conditions. An operator of a UPS is typically able to configure and control the UPS either through a computer coupled to the UPS or through a user interface of the UPS itself.

SUMMARY

Aspects in accord with the present invention are directed to a power device comprising an input configured to be coupled to a power source and to receive input power from the power source, power circuitry coupled to the input, a plurality of outlets, a network module configured to be coupled to a network, a controller coupled to the plurality of outlets, the power circuitry and the network module, the controller configured to operate the power circuitry to provide output power to the plurality of outlets derived from the input power, provide a management interface to a management system via the network module and the network, the management interface configured to allow an operator to provide an indication of a type of equipment coupled to each one of the plurality of outlets, and display, via the management interface, a plurality of network configuration options in a layout based on the indication of the type of equipment coupled to each one of the plurality of outlets provided by the operator.

According to one embodiment, the controller is further configured to display, via the management interface, a first network configuration option associated with a first one of the plurality of outlets based on the type of equipment coupled to the first one of the plurality of outlets. In one embodiment, the controller is further configured to hide, via the management interface with respect to the first one of the plurality of outlets, a second network configuration option based on the type of equipment coupled to the first one of the plurality of outlets. In another embodiment, the controller is further configured to reject control signals, with respect to the first one of the plurality of outlets, that correspond to the second network configuration option.

According to another embodiment, the controller is further configured to receive from an operator, via the management interface, an indication of whether each of the plurality of outlets is coupled to a network based piece of equipment or a non-network based piece of equipment. In one embodiment, in response to an indication that the first one of the plurality of outlets is coupled to a network based piece of equipment, the controller is further configured to display, via the management interface, a representation of the first network configuration option for the first one of the plurality of outlets. In another embodiment, the first network configuration option includes a rebooting feature implementation option and in response to the operator selecting, via the management interface, the rebooting feature implementation option with respect to the first one of the plurality of outlets, the controller is further configured to periodically check the status of the network, and in response to a determination that the network has failed, operate the first one of the plurality of outlets to cycle power to the network based piece of equipment.

According to one embodiment, in periodically checking the status of the network, the controller is configured to attempt to communicate with at least one server via the network, and in response to a determination that communication with the at least one server has failed, identify that the network as failed. In one embodiment, in attempting to communicate with the at least one server via the network, the controller is further configured to attempt to communicate with a primary server via the network, in response to a determination that communication with the primary server has failed, attempt to communicate with a secondary server via the network, and in response to a determination that communication with the secondary server has failed, identify that the network has failed. In another embodiment, in response to the operator selecting, via the management interface, the rebooting feature implementation option for the first one of the plurality of outlets, the controller is further configured to provide, via the management interface, a reboot control option, and in response to the operator selecting, via the management interface, the reboot control option, the controller is further configured to operate the first one of the plurality of outlets to cycle power to the network based piece of equipment.

According to another embodiment, in response to an indication that the first one of the plurality of outlets is coupled to a non-network based piece of equipment, the controller is further configured to display, via the management interface, a representation of the second network configuration option for the first one of the plurality of outlets. In one embodiment, the second network configuration option includes a timer feature implementation option and in response to the operator selecting, via the management interface, the timer feature implementation option with respect to the first one of the plurality of outlets, the controller is further configured to alternate an operational state of the first one of the plurality of outlets during a scheduled period of time. In another embodiment, the controller is further configured to receive from the operator, via the management interface, the scheduled period of time. In one embodiment, in response to an indication that the first one of the plurality of outlets is coupled to a non-network based piece of equipment, the controller is further configured to provide, via the management interface, a representation of a power control option for the first one of the plurality of outlets, and wherein in response to the operator selecting, via the management interface, the power control option, the controller is further configured to alternate an operational state of the first one of the plurality of outlets.

According to one embodiment, the controller is further configured to receive from the operator, via the management interface, an indication to group the first one of the plurality of outlets with a second one of the plurality of outlets, wherein upon being grouped, the controller is further configured to identify the second one of the plurality of outlets as being coupled to the same type of equipment as the first one of the plurality of outlets and to provide, via the management interface, a representation of a same one of the plurality of network configuration options to the operator for the first one of the plurality of outlets and the second one of the plurality of outlets. In one embodiment, the second one of the plurality of outlets is a static outlet, and the controller is further configured to permanently identify the static outlet as being coupled to a specific type of equipment and to permanently provide, via the management interface, one of the plurality of network configuration options to the operator with respect to the static outlet.

According to another embodiment, the power device further comprises a battery coupled to the power circuitry and configured to provide battery power to the power circuitry, wherein the controller is further configured to operate the power circuitry to provide output power to the plurality of outlets derived from at least one of the input power and the battery power.

Another aspect in accord with the present invention is directed to a method for operating a power device, the power device comprising a plurality of outlets and a controller coupled to the plurality of outlets, the method comprising providing, by the controller, a management interface to an operator, receiving, by the controller via the management interface, an indication of a type of equipment coupled to each one of the plurality of outlets, and displaying, via the management interface, a plurality of network configuration options in a layout based on the indication of the type of equipment coupled to each one of the plurality of outlets.

According to one embodiment, displaying includes displaying, via the management interface, a first network configuration option for each one of the plurality of outlets that is indicated as being coupled to a network based piece of equipment, and displaying, via the management interface, a second network configuration option for each one of the plurality of outlets that is indicated as being coupled to a non-network based piece of equipment. In one embodiment, the method further comprises not displaying, via the management interface, the second network configuration option for each one of the plurality of outlets that is indicated as being coupled to a network based piece of equipment, and not displaying, via the management interface, the first network configuration option for each one of the plurality of outlets that is indicated as being coupled to a non-network based piece of equipment. In another embodiment, the method further comprises blocking, with the controller, any control signals, corresponding to the second network configuration option, for any of the plurality of outlets indicated as being coupled to a network based piece of equipment, and blocking, with the controller, any control signals, corresponding to the first network configuration option, for any of the plurality of outlets indicated as being coupled to a non-network based piece of equipment.

According to another embodiment, displaying a first network configuration option includes displaying, via the management interface, a rebooting feature implementation option, and wherein displaying a second network configuration option includes displaying, via the management interface, a timer feature implementation option. In one embodiment, the method further comprises periodically checking status of the network in response to the operator selecting the rebooting feature implementation option with respect to a first one of the plurality of outlets, and in response to a determination that the network has failed, operating the first one of the plurality of outlets to cycle power to the network based piece of equipment coupled to the first one of the plurality of outlets. In another embodiment, the method further comprises providing, in response to the operator selecting the rebooting feature implementation option with respect to a first one of the plurality of outlets, a reboot control option, and cycling power to the network based piece of equipment coupled to the first one of the plurality of outlets in response to the operator selecting the reboot control option. In one embodiment, the method further comprises alternating an operational state of a first one of the plurality of outlets during a scheduled period of time in response to the operator selecting the timer feature implementation option with respect to the first one of the plurality of outlets.

According to one embodiment, the method further comprises providing, via the management interface in response to an indication that the first one of the plurality of outlets is coupled to a non-network based piece of equipment, a power control option with respect to the first one of the plurality of outlets, and alternating an operational state of the first one of the plurality of outlets in response to the operator selecting the power control option.

According to another embodiment, the method further comprises grouping a first one of the plurality of outlets with a second one of the plurality of outlets, and in response to grouping the first one of the plurality of outlets with the second one of the plurality of outlets, identifying the first one of the plurality of outlets as being coupled to a same type of equipment as the second one of the plurality of outlets and providing a same one of the plurality of network configuration options to both the first one of the plurality of outlets and the second one of the plurality of outlets.

At least one aspect in accord with the present invention is directed to a network connectivity confirmation system comprising a network access device configured to communicate, via a network, with at least one dedicated server with which the network access device has a predefined relationship, and a network monitoring device coupled to the network access device, wherein the network access device is configured to provide network access to a device in communication with the network access device, wherein the network monitoring device is configured to periodically attempt to communicate with the at least one server via the network access device and the network, and wherein in response to a determination that it cannot communicate with the at least one server, the network monitoring device is further configured to identify that the network has failed.

According to one embodiment, in communicating with the at least one dedicated server, the network access device is further configured to communicate, via the network, with at least one primary server with which the network access device has a predefined relationship, and communicate, via the network, with at least one secondary server with which the network access device has a predefined relationship. In one embodiment, in communicating with the at least one primary server and the at least one secondary server, the network monitoring device is configured to periodically attempt to communicate with the at least one primary server via the network access device and the network, determine whether communication with the at least one primary server is possible, in response to a determination that communication with the at least one primary server is not possible; periodically attempt to communicate with the at least one secondary server via the network access device and the network, and determine whether communication with the at least one secondary server is possible.

According to another embodiment, the network monitoring device is further configured to in response to a determination that communication with the at least one secondary server is possible, transmit a notification to a network manager, via the network access device, the network, and the at least one secondary server, that the at least one primary server has failed. In another embodiment, the network monitoring device is further configured to in response to a determination that communication with the at least one secondary server is possible, request, from the network manager, an assignment of a new primary server to the network access device.

According to one embodiment, the network monitoring device is further configured to in response to a determination that communication with the at least one secondary server is not possible, identify that the network has failed. In one embodiment, in determining whether communication with the primary server is possible, the network monitoring device is further configured to increment a primary failure counter each time a communication to the at least one primary server is unsuccessful, and determine that communication with the at least one primary server is not possible in response to the primary failure counter exceeding a primary failure threshold. In another embodiment, in determining whether communication with the at least one secondary server is possible, the network monitoring device is further configured to increment a secondary failure counter each time a communication to the at least one secondary server is unsuccessful, and determine that communication with the at least one secondary server is not possible in response to the secondary failure counter exceeding a secondary failure threshold.

According to another embodiment, the network connectivity confirmation system is in combination with a power device having at least one outlet, the network access device is coupled to the at least one outlet of the power device, and in response to the network monitoring device identifying that the network has failed, the network monitoring device is further configured to transmit a signal to the power device to instruct the power device to cycle power to the at least one outlet.

One aspect in accord with the present invention is directed to a method for identifying a status of a network, the method comprising periodically attempting, with a network monitoring device, to communicate with a primary server via a network and a network access device, determining, with the network monitoring device, whether the communication with the primary server is possible, in response to a determination that communication with the primary server is not possible, periodically attempting to communicate with a secondary server via the network access device and the network, determining whether communication with the secondary server is possible, and in response to a determination that communication with the secondary server is not possible, determining that the network has failed.

According to one embodiment, the method further comprises in response to a determination that communication with the secondary server is possible, transmitting a notification to a network manager, via the network access device, the network, and the secondary server, that the primary server has failed. In one embodiment, the method further comprises in response to a determination that communication with the secondary server is possible, assigning a new primary server to the network access device.

According to another embodiment, determining whether the communication with the primary server is possible includes incrementing a primary failure counter each time a communication to the primary server is unsuccessful, and determining that communication with the primary server is not possible in response to the primary failure counter exceeding a primary failure threshold. In one embodiment, determining whether the communication with the second server is possible includes incrementing a secondary failure counter each time a communication to the at least one secondary server is unsuccessful, and determining that communication with the at least one secondary server is not possible in response to the secondary failure counter exceeding a secondary failure threshold.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings:

FIG. 4A is a screenshot view of a network configuration screen of a UPS management UI where only one outlet is identified as a network outlet and a rebooting feature is implemented in the network configured outlet in accordance with aspects of the present invention;

FIG. 4B is a screenshot view of a network configuration screen of a UPS management UI during a transition period after a operator has selected to group two network configured outlets together in accordance with aspects of the present invention;

DETAILED DESCRIPTION

Figure 1:
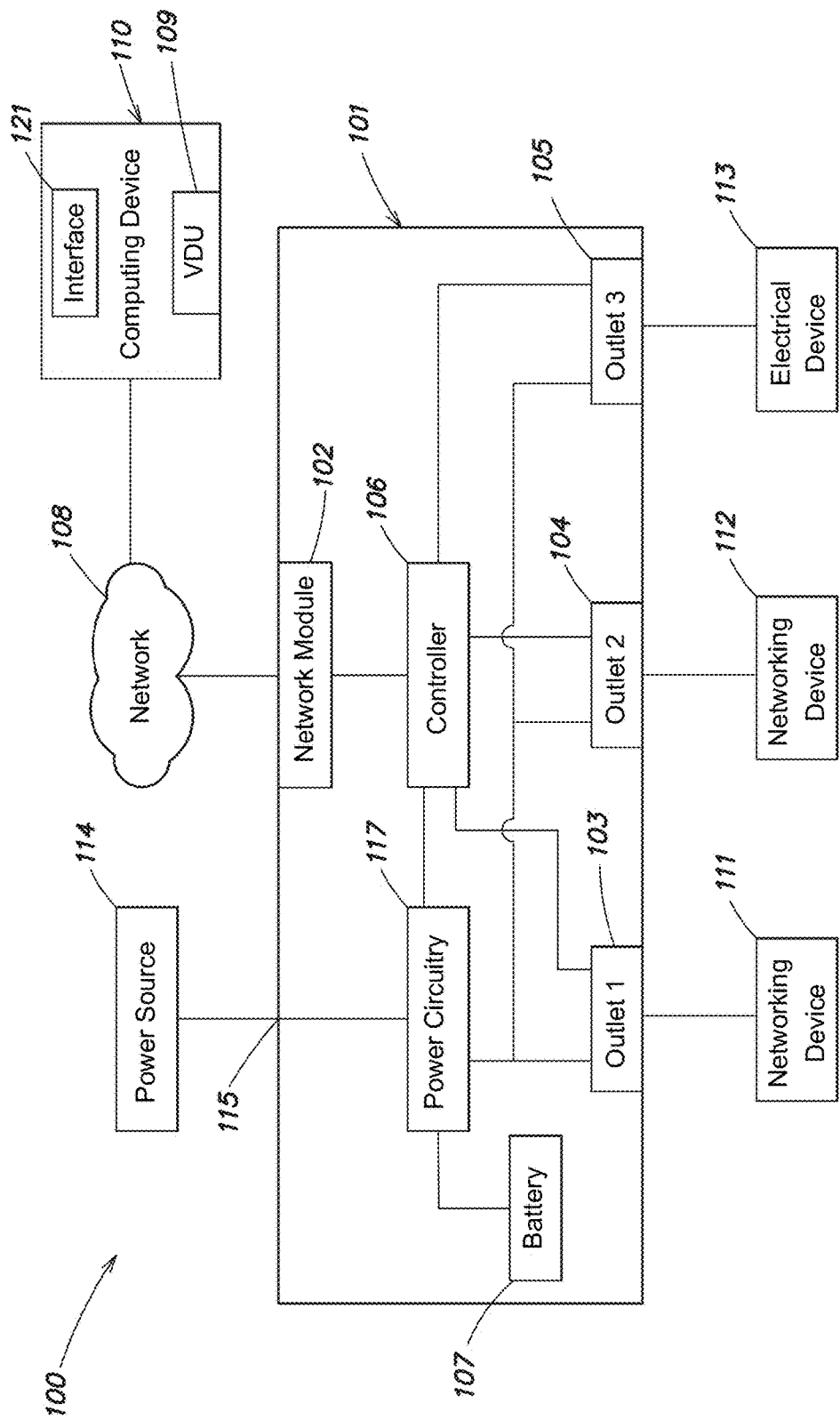
FIG. 1 is a block diagram of a network system including an Uninterruptible Power Supply (UPS) system in accordance with aspects of the present invention.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, Uninterruptible Power Supplies (UPS) are commonly used to provide regulated, uninterrupted power to sensitive and/or critical loads, such as network equipment. Some conventional UPS's include outlets that are selectively configurable, by an operator, to provide different features. The control and configuration of the outlets is typically managed with a UPS management User Interface (UI) which can be accessible via a mobile application, tablet computer, desktop computer, etc. The UPS management UI can also be accessible via a display on the UPS itself. Through operation of the UPS management UI, an operator can select which features are to be implemented at each one of the outlets.

In conventional UPS's, an operator may typically configure any outlet with any of the available features. The availability of a feature does not depend on the type of equipment that is currently plugged into the outlet. This may jeopardize the functionality or operability of equipment coupled to the UPS as some available features may only be intended for use with a specific type of equipment. For example, a timer feature automatically alternates an operational state of an outlet (e.g., turns on or off the outlet) during a scheduled period of time. Such a feature may be helpful to automatically turn off lights coupled to an outlet during the day; however, if the timer feature is implemented with an outlet coupled to important network equipment (e.g., a modem or a router), the network equipment may be turned off and the user may inadvertently lose network access. Alternatively, a rebooting feature automatically cycles power to an outlet if needed. Such a feature may be helpful to automatically cycle power to network equipment when a network connectivity issue is identified; however, if the rebooting feature is implemented with an outlet coupled to non-network equipment (e.g., a light, a phone, a display, etc.), power to the non-network equipment may be cycled inadvertently which can waste power and create user confusion (e.g., due to the non-network equipment randomly turning off and on).

If an operator of a UPS system does not appreciate the impact of implementing certain features with unintended types of equipment or if an operator accidently selects a feature to be implemented on an outlet coupled to an unintended piece of equipment, the availability of critical equipment (e.g., network equipment) may be jeopardized. In addition, based on the potential for selecting an inappropriate configuration, an operator of a UPS system may be hesitant to utilize all of the available features of a UPS system.

Embodiments described herein provide a UPS system that implements appropriate features in an outlet based on the type of equipment the outlet is protecting. The UPS system limits the features available for selection by an operator for an outlet based on the equipment type plugged into the outlet. By only displaying selectable features with respect to an outlet that are appropriate for the type of equipment plugged into the outlet, the UPS system protects operators from incorrect or accidental configurations. In addition, by hiding inappropriate features based on the equipment type plugged into the outlet, an operator may have confidence that the risk of selecting an inappropriate configuration is minimized.

FIG. 1 is a block diagram of a network system 100 including an Uninterruptible Power Supply (UPS) system 101 in accordance with aspects of the present invention. The UPS system 101 includes a power input 115, power circuitry 117, a network module 102, a first outlet 103, a second outlet 104, a third outlet 105, a controller 106, and a battery 107. The controller 106 is coupled to the first outlet 103, the second outlet 104, the third outlet 105, and the network module 102. The controller 106 is also coupled to the power circuitry 117. The network module 102 is configured to be coupled to an external computing device 110 via a network 108. The first outlet 103 is configured to be coupled to a first load 111. The second outlet 104 is configured to be coupled to a second load 112. The third outlet 105 is configured to be coupled to a third load 113. The power input 115 of the UPS 101 is configured to be coupled to a power source 114. The power circuitry 117 is coupled between the power input 115 and the outlets 103, 104, 105. The power circuitry 117 is also coupled to the battery 107.

The UPS 101 is configured to receive, at the input 115, input power from the power source 114. If the controller 106 determines that the input power is acceptable (e.g., at least at a desired level), the controller 106 operates the power circuitry 117 to provide desired output power to each outlet 103, 104, 105 derived from the input power. If the input power is acceptable, the controller 106 may also operate the power circuitry 117 to provide power to the battery 107 to charge the battery 107. If the controller 106 determines that the input power is unacceptable (e.g., below the desired level), the controller 106 operates the power circuitry 117 to provide desired output power to each outlet 103, 104, 105 derived from backup power provided by the battery 107. According to one embodiment, the power circuitry 117 includes conversion circuitry (e.g., at least one converter and/or an inverter) that is operated by the controller 106 to generate regulated output power from the input power and/or the backup power.

The controller 106 is configured to communicate with a management system 110 via the network module 102 and the network 108. In one embodiment, the management system 110 is a computing device 110. For example, in one embodiment, the computing device 110 is an operator's computer system; however, in other embodiments, the computing device 110 may be any other type of system capable of communicating with the UPS 101 (e.g., a mobile phone, tablet computer, etc.). In one embodiment, the network 108 is the Internet; however, in other embodiments, the network 108 may be any other type of Wide Area Network (WAN). According to another embodiment, the network 108 is a Local Area Network (LAN). In other embodiments, the network 108 may be any other type of network capable of facilitating communication between the UPS 101 and the computing device 110. According to other embodiments, the controller 106 is configured to communicate with any other type of management system that is configured to provide signals to the UPS 101 to control operation of the UPS 101. In other embodiments, the controller 106 is configured to communicate with any number of different external systems (e.g., computing devices, management systems, etc.) via the network module 102 and the network 108.

The controller 106 provides a UPS management UI to the computing device 110 via the network module 102 and the network 108. In one embodiment, the UPS management UI is displayed to an operator via a Video Display Unit (VDU) 109. The operator can interact with the UPS management UI via an interface 121 (e.g., a keypad, touchpad, keyboard, mouse, etc.) of the computing device 110.

The UPS management UI allows the operator to identify which type of equipment (e.g., network based vs. non-network based) is plugged into each outlet 103, 104, 105. Based on the equipment identification by the operator, the UPS management UI displays selectable feature options for each outlet that are appropriate for the equipment type plugged into each outlet. The UPS management UI hides (i.e., does not display) feature options that are not appropriate for each outlet. For example, if a piece of network equipment is coupled to the first outlet 103, the UPS management UI may display a selectable rebooting feature in relation to the first outlet 103 and hide a timer feature. Alternatively if a non-network piece of equipment is coupled to the third outlet 105, the UPS management UI may display the timer feature and hide the rebooting feature with respect to the third outlet 105.

By only showing feature options that are appropriate for each outlet and hiding options that are not appropriate, the UPS management UI simplifies the selection of an appropriate outlet configuration for the UPS 101 and minimizes the potential use of an outlet configuration that may lead to network connectivity issues.

According to one embodiment, the controller 106 also monitors commands input to the UPS 101 by the operator (or some other external system) and, based on the outlet configuration set by the operator, rejects or blocks incorrect or inappropriate commands. For example, if the first outlet 103 is identified by the operator as being coupled to a network device and the controller receives a command to implement a timer feature for the first outlet 103, the controller 105 rejects the command as a timer feature cannot be implemented for a network device. Similarity, if the third outlet 105 is identified by the operator as being coupled to a non-network device and the controller receives a command to implement a rebooting feature for the third outlet 105 the controller 105 rejects the command as a rebooting feature cannot be implemented for a non-network device.

By rejecting incorrect or inappropriate commands based on the operator-defined configuration of the outlets, the controller 106 can minimize errors by the operator and also prevent conflicting commands from multiple different external computing devices (e.g., from multiple different operators or management systems) from leading to inappropriate operation of the UPS 101. By rejecting commands that conflict with the operator-defined configuration of the outlets (e.g., a command to turn off a network configured outlet), the controller 106 can also provide additional network security as service attacks from an external system which are intended to shut down a network configured outlet are rejected.

According to one embodiment, the UPS 101 includes a mix of static and dynamic outlets. A static outlet is an outlet that is permanently configured to be coupled to a certain type of load. For example, in one embodiment, the first outlet 103 of the UPS 101 is a static outlet permanently configured to be coupled to a piece of network equipment and the third outlet 105 is a static outlet permanently configured to be coupled to a piece of non-network equipment. The second outlet 104 is a dynamic outlet which may be identified, by the operator, as being coupled to a network or non-network piece of equipment. According to other embodiments, the UPS 101 may include any number of static and/or dynamic outlets.

The UPS management UI automatically displays, with respect to the first static outlet 103, selectable features appropriate for an outlet coupled to a network device and automatically displays, with respect to the third static outlet 105, selectable features appropriate for an outlet coupled to a non-network device. The operator utilizes the UPS management UI to identify whether the second dynamic outlet 104 is coupled to a network or non-network piece of equipment. Based on the identification of the type of equipment that is coupled to the second outlet 104, the UPS management UI automatically displays the appropriate feature options for the identified type of equipment.

Figure 2A:
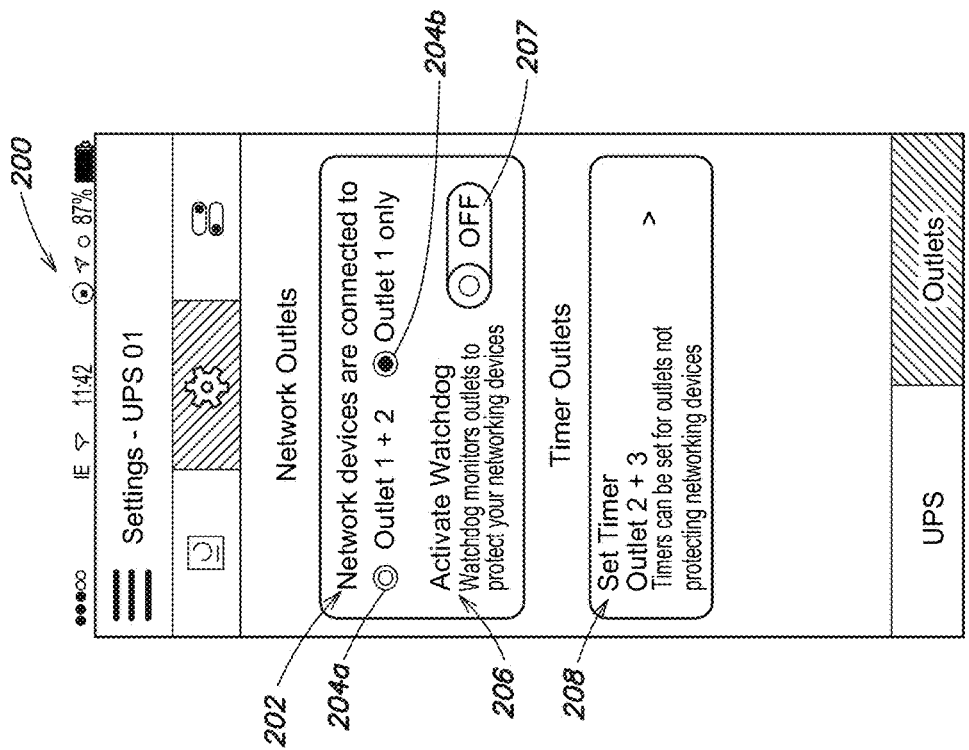
FIG. 2A is a screenshot view of a network configuration screen of a UPS management UI in accordance with aspects of the present invention.

Operation of the UPS management UI is discussed in greater detail below with reference to FIGS. 2A-8. FIG. 2A is a screenshot view of one embodiment of a network configuration screen 200 of the UPS management UI. The operator can access the network configuration screen 200 by selecting a network configuration button 201. The network outlet selection screen 200 includes a network outlet selection area 202. The network outlet selection area 202 includes radio buttons 204a, 204b which allow an operator to select which outlets of the UPS 101 are coupled to network equipment (i.e., are network based outlets). According to one embodiment and as shown in FIG. 2A, the network outlet selection area 202 includes a first radio button 204a that allows an operator to identify the first outlet 103 and the second outlet 104 as being coupled to network equipment and a second radio button 204b that allows an operator to identify only the first outlet 103 as being coupled to a network device. The network outlet selection area 202 does not provide the third outlet 105 as a selectable option as the third outlet 105 is a static switch that is permanently configured to be coupled to non-network equipment (i.e., is a non-network outlet). The network outlet selection area 202 also does not allow an operator to deselect the first outlet 103 as being coupled to a network piece of equipment as the first outlet 103 is a static outlet that is permanently configured to be coupled to network equipment.

Figure 2B:
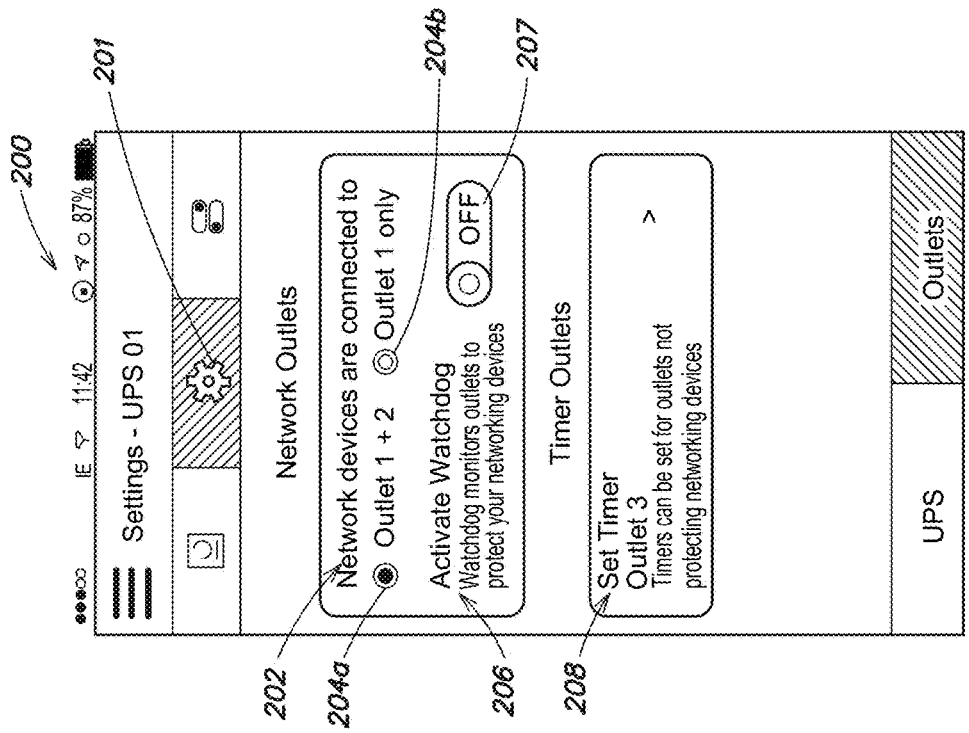
FIG. 2B is a screenshot view of a network configuration screen of a UPS management UI illustrating only one network configured outlet in accordance with aspects of the present invention.

According to one embodiment, the UPS management UI has a default mode in which it assumes that the first outlet 103 is coupled to a first piece of network equipment (e.g., a modem) and the second outlet 104 is coupled to a second piece of network equipment (e.g., a router). In the default mode, the first radio button 204a in the network outlet selection area 202 is automatically selected, indicating that the first outlet 103 and the second outlet 104 are each coupled to a different piece of network equipment. The operator may also manually select the first radio button 204a, indicating that the first outlet 103 and the second outlet 104 are each coupled to a different piece of network equipment. The operator may select the second radio button 204b to indicate that only the first outlet 102 is a network configured outlet. FIG. 2B is a screenshot view of one embodiment of the network configuration screen 200 of the UPS management UI illustrating only the first outlet 103 as being identified as a network outlet.

The network outlet selection screen 200 includes a network outlet feature selection area 206 that lists the selectable features that are available to be implemented in the selected network based outlets. The network outlet feature selection area 206 includes a switch 207 corresponding to each available feature that allows the operator to choose whether that feature should be implemented with the network outlets, or not. For example, as shown in FIG. 2A, the network outlet feature selection area 206 includes a rebooting feature (i.e., "Watchdog") that can be implemented in any of the network configured outlets. An operator may utilize the switch 207 to activate or deactivate the rebooting feature with regard to the network configured outlets.

Figure 3B:
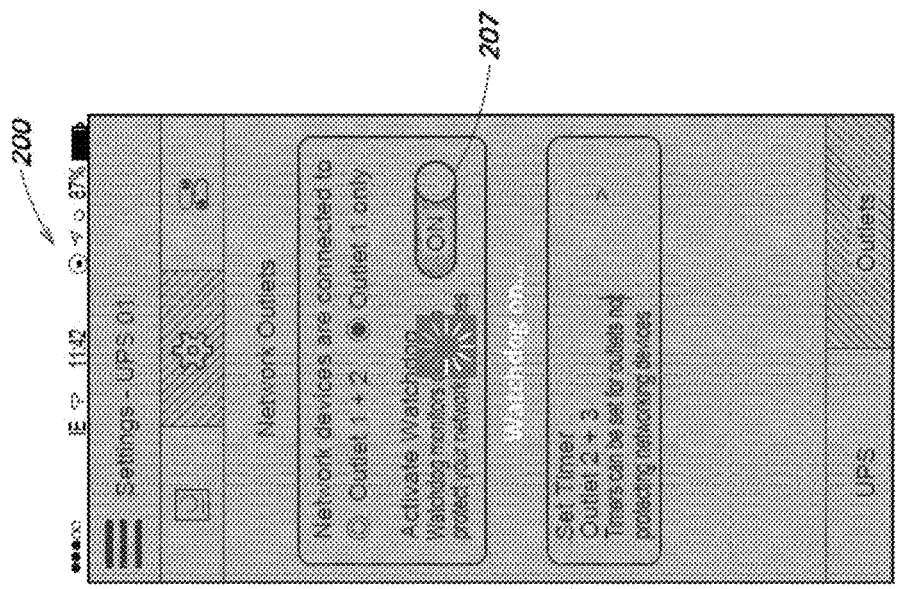
FIG. 3B is a screenshot view of a network configuration screen of a UPS management UI during a transition period after the operator has selected to implement the rebooting feature in a single network configured outlet in accordance with aspects of the present invention.
Figure 3A:
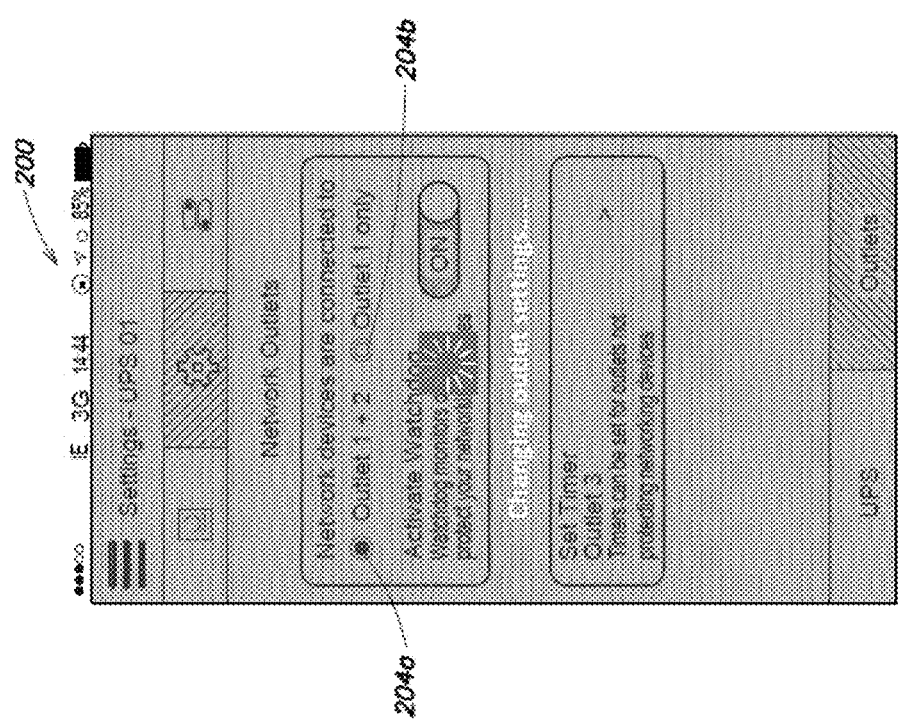
FIG. 3A is a screenshot view of a network configuration screen of a UPS management UI during a transition period after an operator has selected to implement the rebooting feature in multiple grouped network configured outlets in accordance with aspects of the present invention.

When the first radio button 204a is selected and the first outlet 103 and the second outlet 104 are identified as each being coupled to a different piece of network equipment (as shown in FIG. 2A), the controller 106 groups the first and second outlets 103, 104 together, applies the same settings to both outlets 103, 104, and displays the same selectable features for both outlets 103, 104. For example, if the first radio button 204a is selected and the operator utilizes the switch 207 to turn on the rebooting feature, the rebooting feature is implemented in both the first outlet 103 and the second outlet 104. Also when the first radio button 204a is selected, the controller 106 prevents a timer feature from being implemented in either the first outlet 104 or the second outlet 104. FIG. 3A is a screenshot view of one embodiment of the network configuration screen 200 of the UPS management UI during a transition period after the operator has selected, via switch 207, to implement the rebooting feature in the first outlet 103 and the second outlet 104. After the rebooting feature has been implemented in the first outlet 103 and the second outlet 104, the operator may turn off the rebooting feature by again utilizing the switch 207.

When the second radio button 204b is selected, only the first outlet 103 is identified as being coupled to a piece of network equipment (e.g., a combined modem/router) and the second outlet 104 is identified as being coupled to piece of non-network equipment. If the second radio button 204b is selected after the first outlet 103 and second outlet 104 were previously grouped together, the controller 106 decouples the operation of the outlets 103, 104, maintains the implementation of any previously selected network appropriate features (e.g., the rebooting feature) with the first outlet 103, deactivates any network appropriate features with regard to the second outlet 104, prevents any network appropriate features (e.g., a rebooting feature) from being implemented in the second outlet 104, and prevents any non-network appropriate features (e.g., a timer) from being implement in the first outlet 103. After the second radio button 204b is selected, the operator may choose to activate or deactivate any network appropriate feature with respect to the first outlet. For example, the operator may choose to activate or deactivate the rebooting feature with regard to the first outlet 103 via the switch 207. FIG. 3B is a screenshot view of one embodiment of the network configuration screen 200 of the UPS management UI during a transition period after the operator has selected, via switch 207, to implement the rebooting feature in only the first outlet 103. After the rebooting feature has been implemented in the first outlet 103, the operator may turn off the rebooting feature by again utilizing the switch 207.

The network outlet selection screen 200 also includes a non-network feature selection area 208 that lists the current non-network based outlets based on the configuration of network outlets set by the operator. For example, as shown in FIG. 2A, when the operator sets the first outlet 103 and the second outlet 10 as network outlets, the non-network feature selection area 208 identifies the third outlet 105 as being coupled to a non-network piece of equipment. As shown in FIG. 2B, when the operator sets only the first outlet 103 as a network outlet, the non-network feature selection area 208 identifies the second outlet 104 and the third outlet 105 as being coupled to non-network pieces of equipment. By selecting the non-network feature selection area 208, the operator can choose to implement non-network appropriate features (e.g., a timer) in any of the non-network configured outlets.

If the first radio button 204a is selected by the operator after the second radio button 204b was previously selected, the controller 106 groups the first and second outlets 103, 104 together, applies the same settings to both outlets 103, 104, and displays the same selectable features for both outlets 103, 104, as discussed above. Also, if the rebooting feature was previously selected by the operator to be implemented in the first outlet 103, when the first outlet 103 and second outlet 104 are grouped together, the rebooting feature will also automatically implement the rebooting feature in the second outlet 104. For example, FIG. 4A is a screenshot view of one embodiment of the network configuration screen 200 of the UPS management UI where only the first outlet 103 is identified as a network outlet and the rebooting feature is implemented in the first outlet 103. The non-network feature selection area 208 lists the second outlet 104 and the third outlet 105 as non-network outlets. FIG. 4B is a screenshot view of one embodiment of the network configuration screen 200 of the UPS management UI during a transition period after the operator has selected the first radio button 204a to group the first outlet 103 and the second outlet 104 as network outlets. Once the first outlet 103 and the second outlet 104 are grouped as network outlets, only the third outlet 105 is displayed in the non-network feature selection area 208 as a non-network outlet.

Figure 4C:
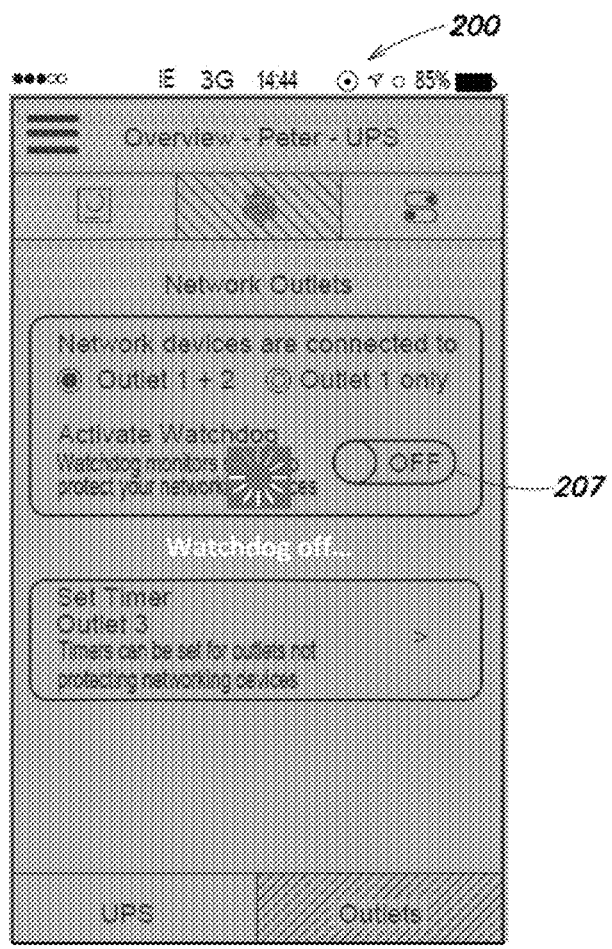
FIG. 4C is a screenshot view of a network configuration screen of a UPS management UI during a transition period after an operator has deactivated a rebooting feature with regard to two grouped network configured outlets in accordance with aspects of the present invention.

As shown in FIG. 4B, upon the operator selecting the first radio button 204a, the rebooting feature, previously only implemented in the first outlet 103, is automatically implemented in both the first outlet 103 and second outlet 104. The rebooting feature remains implemented in the first outlet 103 and the second outlet 104 until deactivated by the operator. FIG. 4C is a screenshot view of one embodiment of the network configuration screen 200 of the UPS management UI during a transition period after the operator has utilized the switch 207 to deactivate the rebooting feature with regard to the first outlet 103 and the second outlet 105.

As discussed above, by selecting the non-network feature selection area 208 in the network outlet selection screen 200, the operator can choose to implement non-network appropriate features in any of the non-network configured outlets. According to one embodiment, selection of the non-network feature selection area 208 allows the operator to implement timer features for any of the non-network configured outlets. For example, if the second radio button 204b is selected such that the first outlet is identified as a network outlet, the second outlet 104 and the third outlet 105 are identified as non-network outlets and are displayed in the non-network feature selection area 208.

Figure 5:
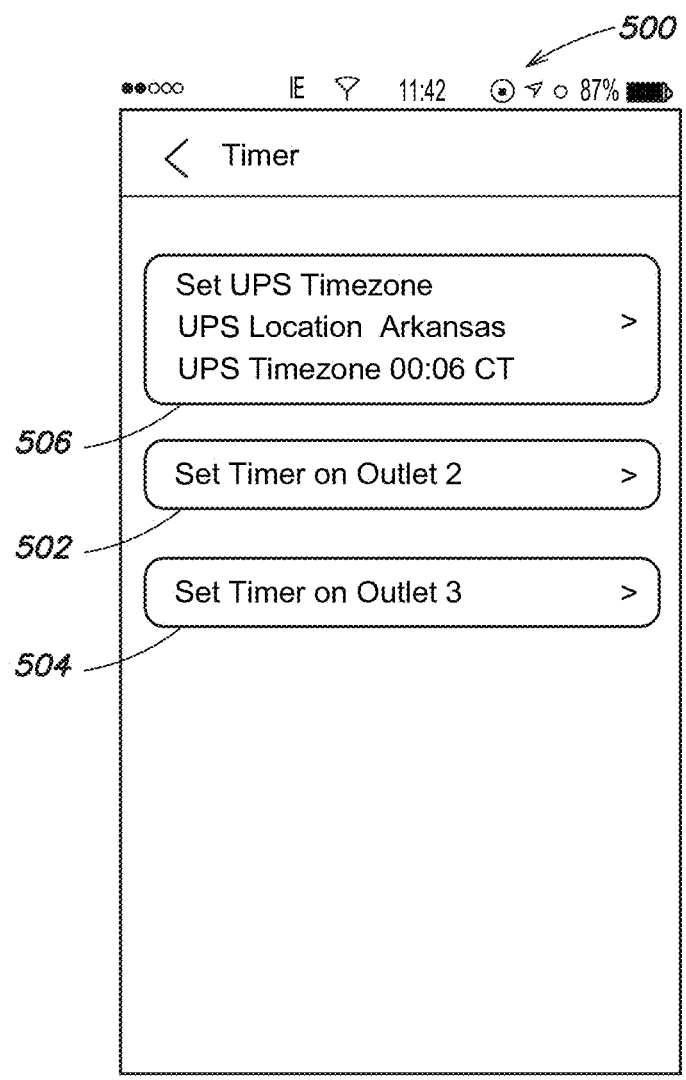
FIG. 5 is a screenshot view of one embodiment of a timer selection screen in accordance with aspects of the present invention.

Upon the user selecting the non-network feature selection area 208 including the second outlet 104 and the third outlet 105, a timer selection screen is displayed to the operator. FIG. 5 is a screenshot view of one embodiment of a timer selection screen 500. The timer selection screen 500 includes a timer configuration button 502 corresponding to the second outlet 104 and a timer configuration button 504 corresponding to the third outlet 105. By selecting the timer configuration button 502, the operator can set a timer feature value for the second outlet 104 and by selecting the timer configuration button 504, the operator can set a timer feature value for the third outlet 105. The set timer feature values for each outlet determine a scheduled period of time that the operational state of the non-network outlet should be alternated (e.g., turned from on to off or off to on). According to one embodiment, the timer selection screen 500 also includes a time zone selection button 506 which, when selected by the operator, allows the operator to set an appropriate time zone for the UPS 101.

Figure 6B:
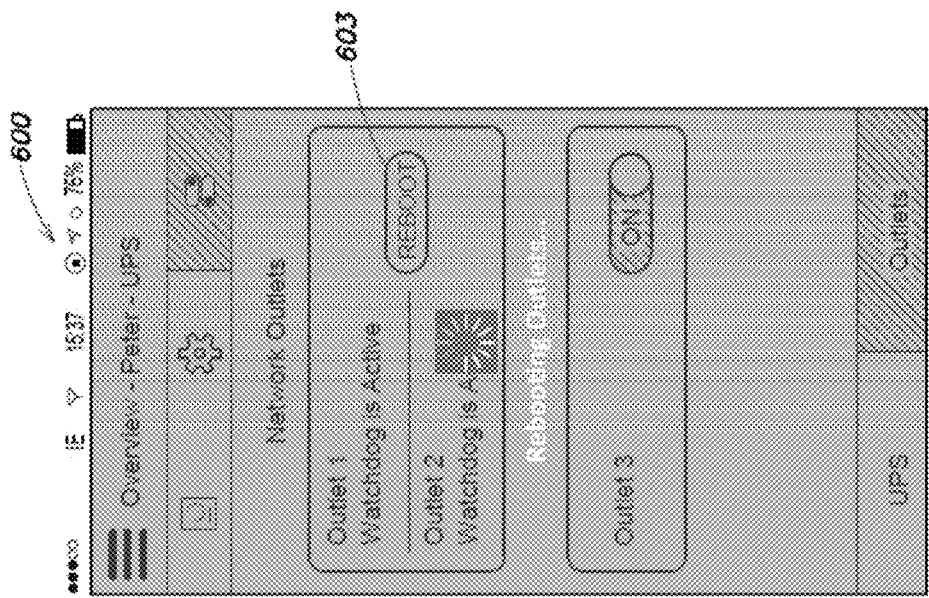
FIG. 6B is a screenshot view of an outlet control screen of a UPS management UI during a transition period after the operator has initiated a command to cycle power to two grouped network configured outlets in accordance with aspects of the present invention.
Figure 6A:
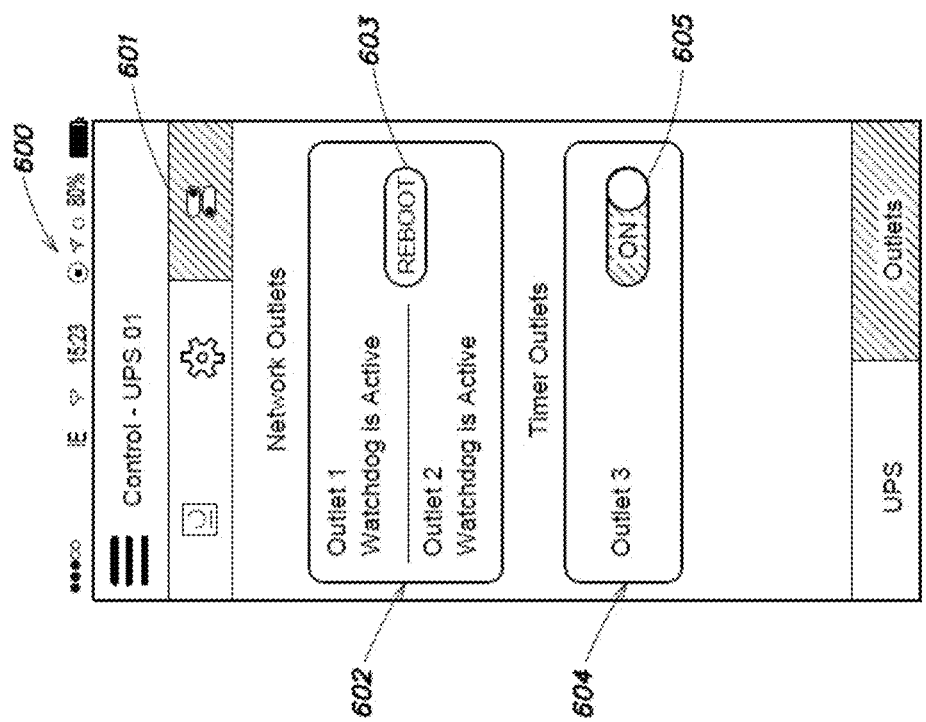
FIG. 6A is a screenshot view of one embodiment of an outlet control screen in accordance with aspects of the present invention.

Once the outlets 103, 104, 105 of the UPS 101 are configured by the operator, as discussed above, the operator can access an outlet control screen by selecting an outlet control button. The outlet control screen allows an operator to send appropriate commands to each of the outlets. FIG. 6A is a screenshot view of one embodiment of an outlet control screen 600. An operator can access the outlet control screen 600 by selecting the outlet control button 601. The outlet control screen 600 includes a network outlet control options section 602 and a non-network outlet control options section 604. The network outlet control options section 602 includes appropriate command options for the network configured outlets and the non-network outlet control options section 604 include appropriate command options for the non-network configured outlets.

For example, in one embodiment as shown in FIG. 6A, where the first outlet 103 and the second outlet 104 are grouped together as network configured outlets (as discussed above), the network outlet control options section 602 includes a listing of the network configured outlets, an identification of the features currently activated for each network outlet (e.g., a rebooting feature), and a command button 603 for initiating a command (i.e., sending a command to the controller 106) with regard to the networked outlets. In one embodiment where the rebooting feature has been activated with regard to both the first outlet 103 and the second outlet 104, the command button 603 is a reboot button that, when selected by the operator, instructs the controller 106 to cycle power to the networked outlets. As the first outlet 103 and the second outlet 104 are grouped together, the same command initiated by the operator is applied to both the first outlet 103 and the second outlet 104. Accordingly, only one reboot switch 603 is necessary as the operator can initiate a reboot command with regard to both outlets 103, 104 by operating the single reboot switch 603. FIG. 6B is a screenshot view of one embodiment of the outlet control screen 600 of the UPS management UI during a transition period after the operator has utilized the switch 603 to initiate a command (i.e., to the controller 106) to cycle power to the first outlet 103 and the second outlet 105.

Figures 7A, 7B:
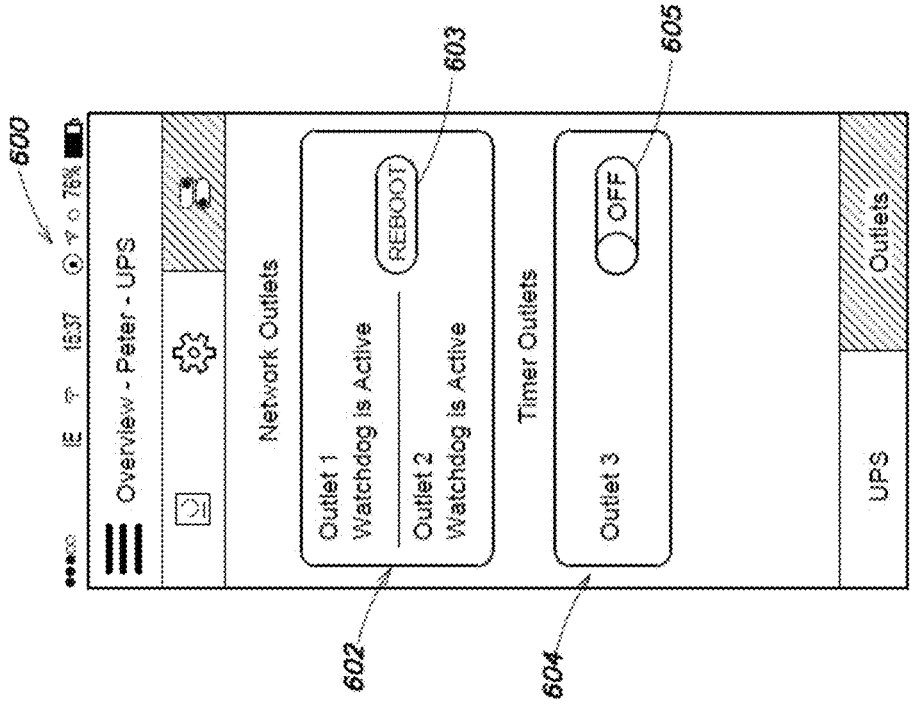
FIG. 7A is a screenshot view of an outlet control screen of a UPS management UI during a transition period after the operator has initiated a command to turn off a non-network configured outlet in accordance with aspects of the present invention.
FIG. 7B is a screenshot view of an outlet control screen of a UPS management UI after a non-network configured outlet has been turned off in accordance with aspects of the present invention.

The non-network outlet control section 604 includes a listing of the previously configured non-network outlets (as discussed above) and a command button 605 for initiating a command (i.e., sending a command to the controller 106) with regard to the non-networked outlets. In one embodiment, the command button 605 is a power button 605 that can be used by the operator to immediately alternate an operational state of the associated non-network outlet (e.g., turn on or off the associated outlet). For example, if the third outlet 105 is identified as a non-network outlet and the third outlet 105 is providing power to a non-network piece of equipment, the non-network outlet control section 604 displays the third outlet 105 as a non-network outlet and the power button 605 shows that the third outlet 105 is currently on. If the operator selects the power button 605, a signal is transmitted to the controller 106 to operate the controller 106 to turn off the third outlet 105. FIG. 7A is a screenshot view of one embodiment of the outlet control screen 600 of the UPS management UI during a transition period after the operator has utilized the switch 605 to initiate a command (i.e., to the controller 106) to turn off the third outlet 105. FIG. 7B is a screenshot view of one embodiment of the outlet control screen 600 of the UPS management UI after the third outlet 105 has been turned off. Once the third outlet 105 has been turned off, the power button 605 indicates that the third outlet 105 is off.

Figure 8:
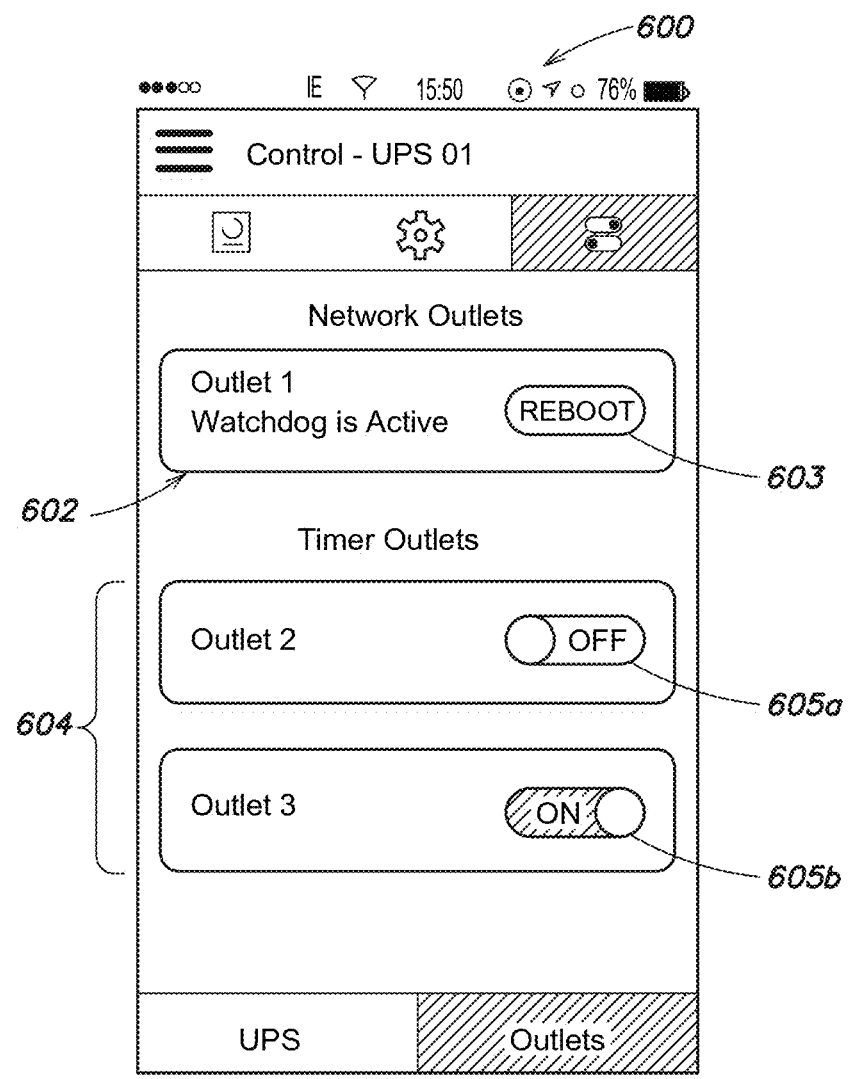
FIG. 8 is a screenshot view of another example of an outlet control screen in accordance with aspects of the present invention.

FIG. 8 is a screenshot view of another embodiment of the outlet control screen 600. If the first outlet 103 is identified as a network outlet and the second outlet 104 and third outlet 105 are identified as non-network outlets, the network outlet control options section 602 lists the first outlet 103 as a network outlet and the non-network outlet control section 604 lists the second outlet 104 and the third outlet 105 as non-network outlets. The network outlet control options section 602 also lists any currently active features (e.g., a rebooting feature) with respect to the first outlet 103 and includes the command button 603 for cycling power to the first outlet 103. The non-network outlet control section 604 lists the second outlet 104 and the third outlet 105 as non-network outlets. The non-network outlet control section 604 also includes a first command button 605a for initiating a command (i.e., sending a command to the controller 106) with regard to the second outlet 104 and a second command button 605b for initiating a command with regard to the third outlet 105. Where the command buttons 605a, 605b are power buttons, the operator can use the first command button 605a to turn on/off the second outlet 104 and the second command button 605b to turn on/off the third outlet 105. For example, as shown in FIG. 8, the first command button 605*a* shows that the second outlet 104 is turned off and the second command button 605*b* shows that the third outlet 105 is turned on.

A summary of the available network configuration and control options with regard to the UPS 101 of FIG. 1 is shown below in Table 1.

TABLE 1

| Settings/Control | Scenarios/options | Outlet 1 | Outlet 2 | Outlet 3 |
|---|---|---|---|---|
| Network Config. Screen (200) | Grouping ON for 1 + 2. Networking equipment powered by both outlets | Rebooting available, Timers not available | | Timer available, no Rebooting |
| | Grouping OFF: Networking equipment powered by outlet 1 only | Rebooting available, Timer not available | Timer available, no Rebooting | Timer available, no Rebooting |
| Outlet Control Screen (600) | Grouping ON (1 + 2) | Outlet reboot only | | Outlet On/Off |
| | Grouping OFF (1) | Outlet reboot only | Outlet On/Off | Outlet On/Off |

As described above, the UPS 101 includes three outlets; however, in other embodiments, any number of outlets may be utilized. As also described above, the UPS 101 includes two static outlets and one dynamic outlet; however, in other embodiments, the UPS 101 may include any number of static and/or dynamic outlets. As also described above, the first outlet 103 of the UPS 101 is a static network configured outlet while the second outlet 104 is a dynamic outlet and the third outlet 105 is a static non-network configured outlet. However, in other embodiments, the configuration of the outlets may be defined in any other appropriate way. For example, where a UPS includes five outlets, any of the five outlets can be identified as a network configured outlet. For example, in one embodiment the first two outlets are identified as network configured outlets. In another embodiment, the third outlet is identified as a network configured outlet. In another embodiment, the fourth and fifth outlets are identified as network configured outlets.

As also described above, the management UI allows an operator to identify whether an outlet is coupled to a network based or non-network based piece of equipment and displays appropriate feature options in relation to the outlet based on whether the outlet is network or non-network based. However, in other embodiments, the management UI is configured to allow an operator to identify some other characteristic of the type of equipment coupled to an outlet and display appropriate feature options in relation to the outlet based on the identified characteristic. For example, in some other embodiments, the management UI is configured to allow an operator to identify equipment as security system equipment, network drives, printers, Network Attached Storage (NAS), or any other type of equipment that an operator would want to prevent from being inadvertently turned off.

As described above, a controller of a UPS provides a UI to an operator that displays appropriate selectable outlet features based on the type of equipment plugged into the outlets of the UPS. However, in other embodiments, such a system may be implemented in some other power device having outlets coupled to both network and non-network equipment. For example, in one embodiment, the controller may be located in a Power Distribution Unit (PDU) and may be configured to provide a PDU management UI to an operator that displays appropriate selectable outlet features (as discussed above) based on the type of equipment plugged into the outlets of the PDU. In another embodiment, the controller may be similarly located in other power devices such as a power strip, outlet, or any other "smart" power device.

As also described above, the management UI is provided to an external display of an operator; however, in other embodiments, the management UI may be provided to a display that is located on the UPS 101 itself.

Embodiments described herein provide a UPS system that implements appropriate features in an outlet based on the type of equipment the outlet is protecting. The UPS system limits the features available for selection by an operator for an outlet and rejects inappropriate commands sent to the outlet based on an outlet configuration defined by an operator. In allowing an operator to define the type of equipment coupled to each outlet in the UPS system, only displaying, in a UPS management UI, selectable features that are appropriate for each outlet based on the equipment identification provided by the operator, and hiding features that are not appropriate for each outlet, the UPS management UI simplifies the selection of an appropriate outlet configuration for the UPS and minimizes the potential use of an outlet configuration that may lead to network connectivity issues, confusion, or even damaged equipment. By utilizing the equipment identification provided by the operator to only display appropriate control/command options with respect to each outlet, the UPS management UI also minimizes incorrect or accidental operation of the UPS by the operator. Also, by rejecting incorrect or inappropriate commands based on the set configuration of the outlets, errors by the operator can be minimized and conflicting commands from multiple different external computing devices (e.g., from multiple different operator or management systems) can be prevented.

As discussed above, network appropriate features can be implemented in network configured outlets. For example, in one embodiment, a network appropriate feature is a rebooting feature (e.g., a "Watchdog" feature) that when implemented in an outlet, automatically cycles power to the outlet when a network connectivity issue is detected. In typical rebooting features, a controller coupled to network equipment attempts to connect to, or "ping", a remote server at predetermined times. If the controller is unable to communicate with the remote server, the controller determines that there is a connectivity issue and cycles power to the network equipment. However, in such typical rebooting features, the remote server may not be dedicated to the purpose of determining network resiliency and is instead an external server utilized for a number of different functions. As such, the configuration of the non-dedicated remote server may change without notice (e.g., due to a manager of the non-dedicated remote server changing a configuration of the server). This may lead to the controller not being able to communicate with the non-dedicated remote server, even if power to the network equipment is cycled. In addition, by only attempting to communicate with a single non-dedicated remote server, the robustness of the system is limited in that if the single server is unavailable, the networking equipment may be restarted unnecessarily, impacting network connectivity.

Embodiments described herein provide a network connectivity confirmation system that utilizes multiple dedicated servers to confirm network connectivity. By using multiple dedicated servers, rather than a single non-dedicated server (as discussed above), the system provides enhanced network resilience.

Figure 9:
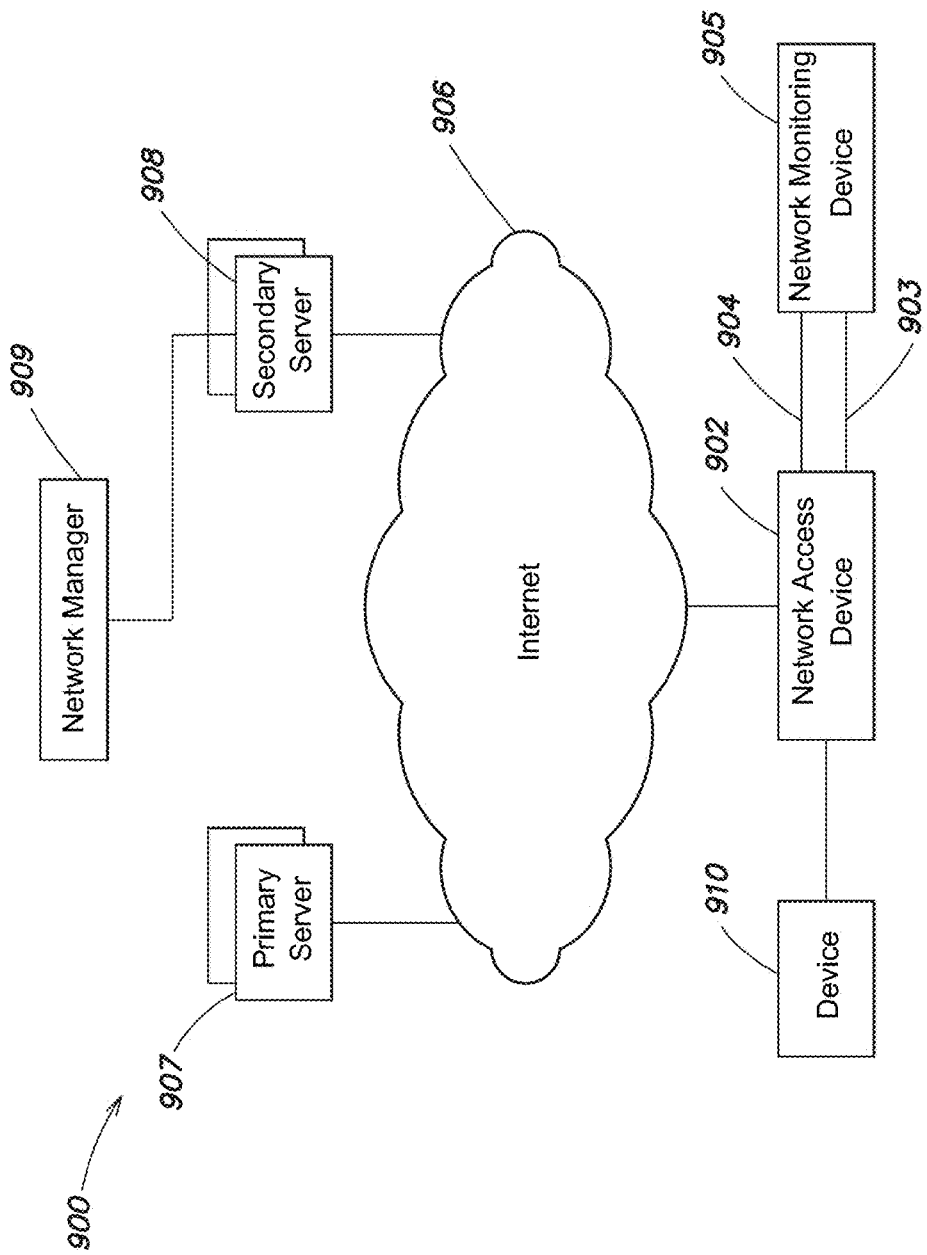
FIG. 9 is a block diagram of one embodiment of a network connectivity confirmation system in accordance with aspects of the present invention.

FIG. 9 is a block diagram of one embodiment of a network connectivity confirmation system 900. The system 900 includes a network access device 902, a network monitoring device 905, a group of primary servers 907, a group of secondary servers 908, and a network manager 909. The network monitoring device 905 is coupled to the network access device 902. The network access device 902 is configured to communicate with the group of primary servers 907 and the group of secondary servers 908 via a network 906. In one embodiment, the network 906 is the Internet; however, in other embodiments, the network 906 may be any other type of LAN or WAN). The network manager 909 is configured to communicate with the group of secondary servers 908.

The network access device 902 is a piece of network equipment (e.g., a server, router, switch, etc) that provides network 906 access to other devices 910. According to one embodiment, the network access device 902 is a piece of network equipment that is coupled to a network configured outlet of the UPS 101 described above with regard to FIG. 1; however, in other embodiments, the network access device 902 may be any other type of network access device that provides network excess to other devices and may be included within a UPS.

The network monitoring device 905 is configured to communicate with the network 906 via a network communication channel 903 and the network access device 902. According to one embodiment, the network monitoring device 905 is also able to control the power that is being supplied to the network access device 902. For example, in one embodiment, the network monitoring device 905 is located in a UPS (e.g., the UPS 101 discussed above with regard to FIG. 1) to which the network access device 902 is coupled. In one embodiment, the network monitoring device 905 is located in the controller 106 of the UPS 101 or is otherwise in communication with the controller 106; however, in other embodiments, the network monitoring device 905 may be configured in some other appropriate way.

In determining the status of the network 906, the network monitoring device 905 periodically attempts to communicate with the primary servers 907. The primary servers are servers in which one function of the server is dedicated to determining the operational status of the network 906 (i.e., responding to inquiries from the network monitoring device 905). If the network monitoring device 905 is unsuccessful in communicating with one of the primary servers 907, the network monitoring device 905 periodically attempts to communicate with the secondary servers 908. The secondary servers 908 are also servers in which one function of the server is dedicated to determining the operational status of the network 906 (i.e., responding to the inquiries from the network monitoring device 905). If the network monitoring device 905 is also unsuccessful in communicating with one of the secondary servers 908, the network monitoring device 905 identifies that there is a problem with the network 906. Upon identifying that there is a problem with the network 906, the network monitoring device may notify the operator, cycle power to the network access device 902, or take some other appropriate action.

According to one embodiment, in communicating with the primary server(s) 907 and the secondary server(s) 908, the network monitoring device 905 utilizes an existing connection that was established over the network 906 for a purpose other than determining network status. The existing network connection has multiple servers and fall-back procedures for ensuring that if the network 906 is functioning properly, a connection with at least one server 907, 908 will occur. In one embodiment, utilizing the existing connection creates a "zero-configuration" situation in which the connection "self-corrects" based on its own internal procedures.

Figure 10:
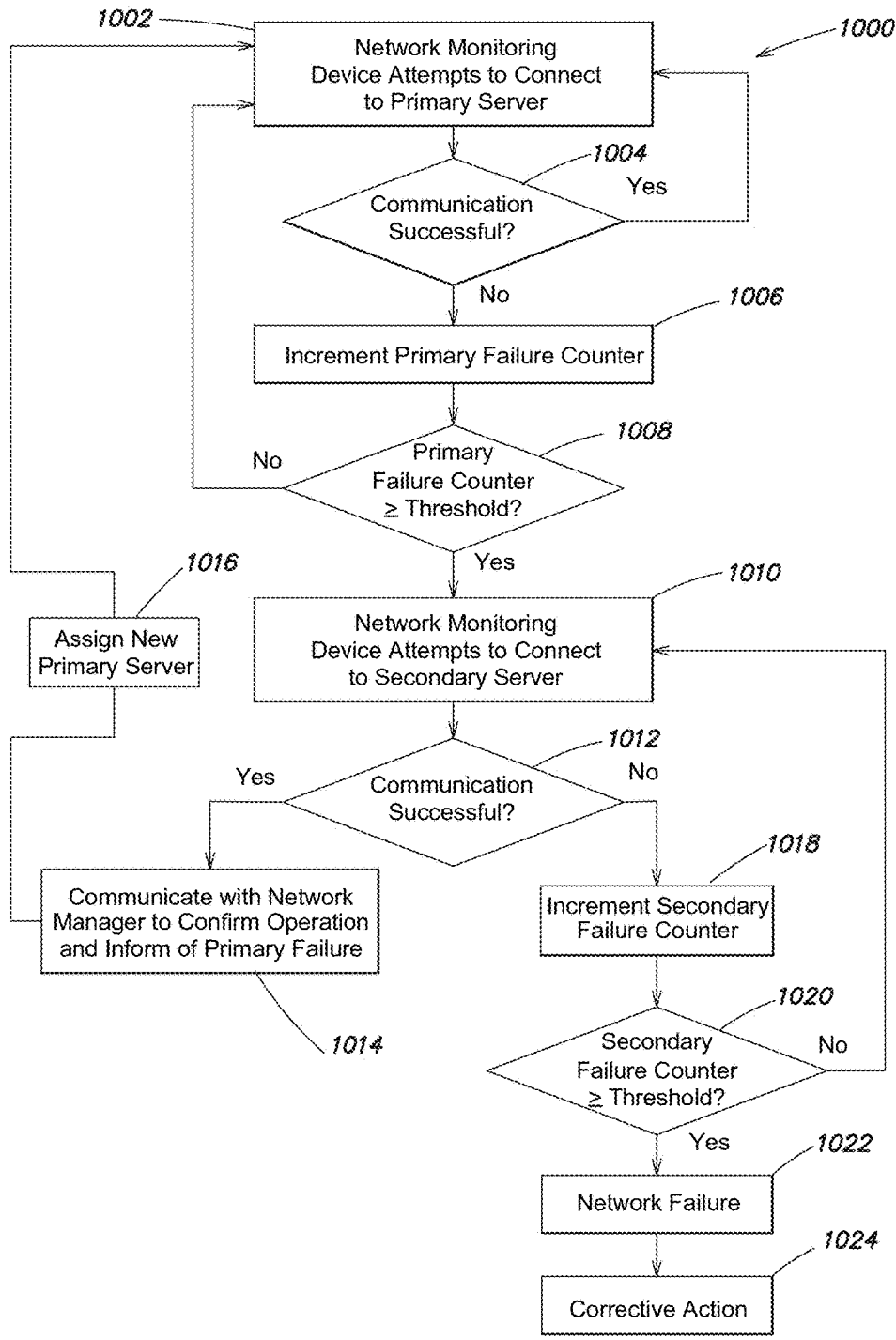
FIG. 10 is a flow chart illustrating one embodiment of a network connectivity confirmation process in accordance with aspects of the present invention.

Operation of the system 900 is discussed in greater detail below with regard to FIG. 10. FIG. 10 is a flow chart 1000 illustrating one embodiment of a network connectivity confirmation process implemented by the system 900. At block 1002, the network monitoring device 905 attempts to communicate with (i.e., transmits a signal to) one of the primary servers 907 via the network access device 902 and the network 906. According to one embodiment, the network monitoring device 905 attempts to communicate with the primary server 907 by utilizing the Transmission Control Protocol (TCP) and/or the User Datagram Protocol (UDP); however, in other embodiments, the network monitoring device 905 may utilize some other protocol to communicate with the primary server 907.

At block 1004, the network monitoring device 905 determines if it is able to communicate with the primary server 907. In response to a determination that it is able to communicate with the primary server 907 (i.e., its transmission was successfully received by the primary server 907), the network monitoring device 905 determines that the network 906 is operating correctly and after a period of time, attempts to communicate with the primary server 907 again (at block 1002). In one embodiment, the period of time between connection attempts is configurable by the operator. According to one embodiment the connection established between the network monitoring device 905 and the primary server 907, via the network 906 and the network access device 902, is secure.

At block 1006, in response to a determination that it is not able to communicate with the primary server 907 (i.e., its transmission as not successfully received by the primary server 907), the network monitoring device 905 increments a primary failure counter value. At block 1008, the network monitoring device 905 determines if the primary failure counter value is greater than or equal to a primary failure threshold value. In one embodiment, the primary failure threshold value is ten; however, in other embodiments, the primary failure threshold value may be configured to any other value. Also, in some embodiments, the primary failure threshold value is set by the operator. In response to a determination that the primary failure counter value is less than the primary failure threshold, the network monitoring device 905 returns to block 1002 and attempts to communicate with the primary server 907.

At block 1010, in response to a determination that the primary failure counter value is at least equal to the primary failure threshold, the network monitoring device 905 attempts to communicate with (i.e., transmits a signal to) a secondary server 908 via the network access device 902 and the network 906. According to one embodiment, the network monitoring device 905 attempts to communicate with the secondary server 908 by utilizing the Transmission Control Protocol (TCP) and/or the User Datagram Protocol (UDP); however, in other embodiments, the network monitoring device 905 may utilize some other protocol to communicate with the secondary server 908. In one embodiment, the network monitoring device 905 attempts to communicate securely with the secondary server 908.

At block 1012, the network monitoring device 905 determines if it is able to communicate with the secondary server 908. In response to a determination that it is able to communicate with the secondary server 908 (i.e., its transmission was successfully received), the network monitoring device 905 determines that the network 906 is operating correctly. According to one embodiment, in response to determining that the network 906 is operating correctly, the network monitoring device 905 sends a message to the network manager 909, via the network access device 902, the network 906, and the secondary server 908 confirming that the secondary server 908 is working appropriate and that there may be a problem with the primary server 907.

Upon receiving the message from the network monitoring device 905, the network manager 909 may take action to investigate and/or fix the problem with the primary server 907. For example, according to one embodiment, the message indicating the failure of the primary server 907 may also include a request by the network monitoring device 904 for the assignment of a new primary server 907 to the network access device 902. In response to receiving such a request, the network manager 909, at block 1016, may assign a new primary server 907 to the network access device 902. Upon the network access device 902 being assigned new primary server 907, at block 1002, the network monitoring device 905 may begin the network connection process again and attempt to communicate with the new primary server 907. In another embodiment, the network manager 909 may automatically assign a new primary server 907 to the network access device 902 upon receiving a message that the original primary server 907 has failed and a specific request from the network monitoring device 904 is not required. According to another embodiment, the network manager 909 may not assign a new primary server 907 to the network access device 902 and, at block 1002, the network monitoring device 905 may again attempt to communicate with the same primary server 907 that previously failed.

At block 1018, in response to a determination that it is not able to communicate with the secondary server 908 (i.e., its transmission was not successfully received), the network monitoring device 905 increments a secondary failure counter value. At block 1020, the network monitoring device 905 determines if the secondary failure counter value is greater than or equal to a secondary failure threshold value. In one embodiment, the secondary failure threshold value is ten; however, in other embodiments, the secondary failure threshold value may be configured to any other value. Also, in some embodiments, the secondary failure threshold value is set by the operator. In response to a determination that the secondary failure counter value is less than the secondary failure threshold, the network monitoring device 905 returns to block 1010 and attempts to communicate with the secondary server 908 again.

At block 1022, in response to a determination that the secondary failure counter value is at least equal to the secondary failure threshold, the network monitoring device 905 determines that the network 906 has failed. At block 1024, the network monitoring device 905 attempts to take corrective action(s) to fix the network 906. In one embodiment, in response to determining that the network 906 has failed, the network monitoring device 905 attempts to reset the network connection. For example, the network connectivity confirmation process 1000 may be selectively implemented in a network configured outlet of the UPS 101 (shown in FIG. 1) by an operator, as discussed above. Upon determining that the network 906 has failed, the network monitoring device 905 may send a command to the controller 106 to cycle power to the outlet of the UPS 101 to which the network access device 902 is coupled. In other embodiments, the network connectivity confirmation process 1000 may be implemented in a network configured outlet of another type of power device (e.g., a power strip, a smart outlet, etc.).

According to other embodiments, upon determining that the network 906 has failed, the network monitoring device 905 may take different corrective measures. For example, in some embodiments the network monitoring device 905 may transmit a message to the network manager 909, may provide a message to an operator's display, or may operate some type of indicator (e.g., a light, sound generator etc.) to indicate that there is a network problem. In other embodiments, upon determining that the network 906 has failed, the network monitoring device 905 performs network analytics on the resulting data.

As described above, the network connectivity confirmation process 1000 is implemented in a UPS; however, in other embodiments, the network connectivity confirmation process is implemented in some other power device (e.g., a power strip, smart outlet, etc.).

As also described above, the network monitoring device is configured to attempt communication with the secondary server only after communication has failed with the primary server a predetermined number of times; however, in other embodiments, the network monitoring device may be configured to attempt communication with the secondary server immediately after a communication failure with the primary server. Similarly, the network monitoring device is configured to identify a network failure only after communication has failed with the secondary server a predetermined number of times; however, in other embodiments, the network monitoring device may identify a network failure immediately after a communication failure with the secondary server.

As described above, the network connectivity confirmation process 1000 may be selectively implemented in a network configured outlet of a power device by an operator (e.g., as discussed above with regard to FIG. 4A); however, in other embodiments, even though the network connectivity confirmation process 1000 is available as a selectable feature to be implemented in a network configured outlet, the operator may choose not to implement the feature in an outlet and turn the feature off with respect to one or more outlets (e.g., as discussed above with regard to FIG. 4C).

As described above, network failure is identified after communication attempts to both a dedicated primary server and a dedicated secondary server have failed; however, in at least one embodiment, a network failure may be identified after communication attempts to a single dedicated server fail. As also described above, communication is attempted with a single primary server before communication with a secondary server is attempted; however, in other embodiments, communication is attempted with multiple primary servers before communication is attempted with a secondary server.

Embodiments described herein provide a network connectivity confirmation system that utilizes multiple servers to confirm network connectivity. By using multiple servers, rather than a single server (as discussed above), the system provides enhanced network resilience. In addition, by utilizing at least one dedicated server having a predefined relationship with a power device such that the dedicated server won't be reconfigured without notice to the power device, potential uncontrollable errors due to server configuration changes can be minimized. Also, by utilizing multiple dedicated secure servers, the network connectivity confirmation system is less likely to be subject to a successful Distributed Denial of Service (DDoS) attack.

Figure 11:
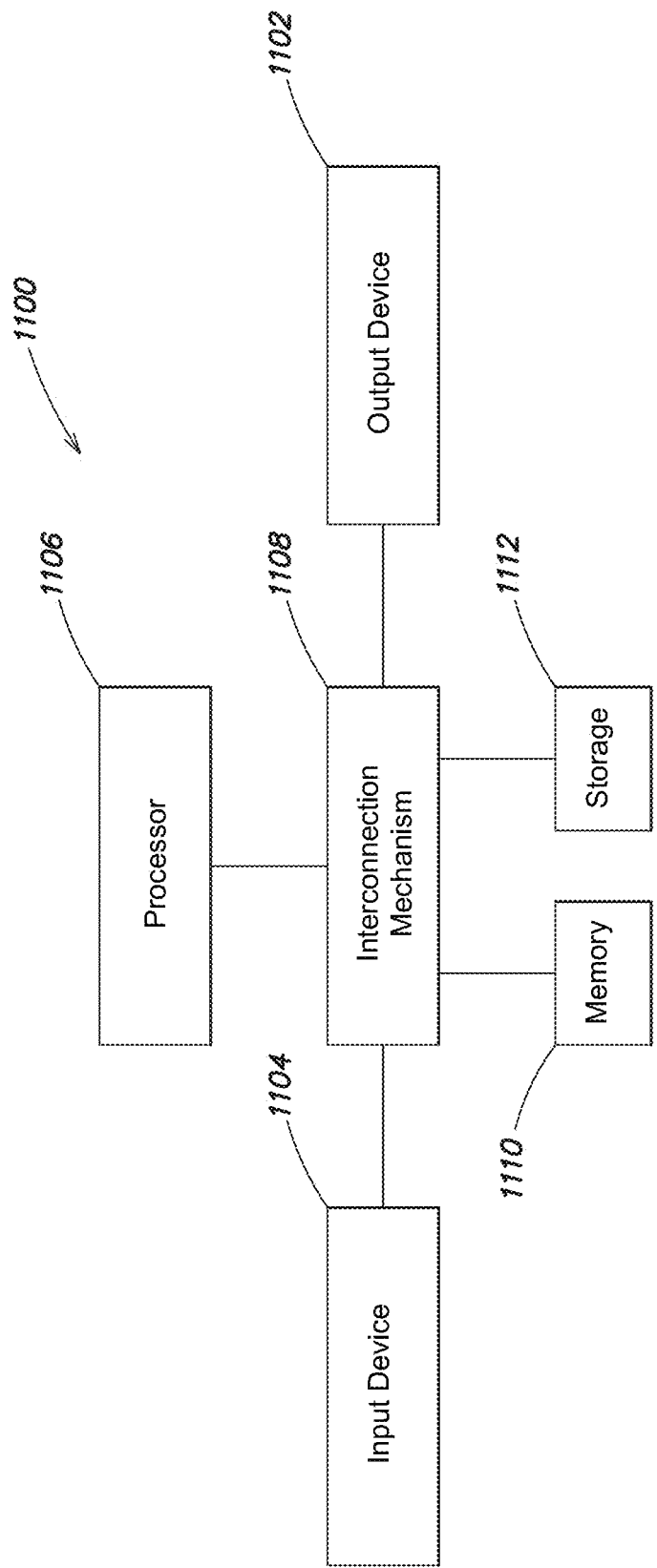
FIG. 11 is an example block diagram of computing components forming a system which may be configured to implement one or more aspects of the present invention.

FIG. 11 illustrates an example block diagram of computing components forming a system 1100 which may be configured to implement one or more aspects disclosed herein. For example, the system 1100 may be communicatively coupled to a controller or included within a controller, and/or configured to provide a management interface to an operator or check the connectivity status of a network as discussed above.

The system 1100 may include for example a computing platform such as those based on Intel PENTIUM-type processor, Motorola PowerPC, Sun UltraSPARC, Texas Instruments-DSP, Hewlett-Packard PA-RISC processors, or any other type of processor. System 1100 may include specially-programmed, special-purpose hardware, for example, an application-specific integrated circuit (ASIC). Various aspects of the present disclosure may be implemented as specialized software executing on the system 1100 such as that shown in FIG. 11.

The system 1100 may include a processor/ASIC 1106 connected to one or more memory devices 1110, such as a disk drive, memory, flash memory or other device for storing data. Memory 1110 may be used for storing programs and data during operation of the system 1100. Components of the computer system 1100 may be coupled by an interconnection mechanism 1108, which may include one or more buses (e.g., between components that are integrated within a same machine) and/or a network (e.g., between components that reside on separate machines). The interconnection mechanism 1108 enables communications (e.g., data, instructions) to be exchanged between components of the system 1100. The system 1100 also includes one or more input devices 1104, which may include for example, a keyboard or a touch screen. The system 1100 includes one or more output devices 1102, which may include for example a display. In addition, the computer system 1100 may contain one or more interfaces (not shown) that may connect the computer system 1100 to a communication network, in addition or as an alternative to the interconnection mechanism 1108.

The system 1100 may include a storage system 1112, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 1110 that allows for faster access to the information by the processor/ASIC than does the medium. This memory 1110 may be a volatile, random access memory such as a dynamic random access memory (DRAM) or static memory (SRAM). It may be located in storage system 1112 or in memory system 1110. The processor 1106 may manipulate the data within the integrated circuit memory 1110 and then copy the data to the storage 1112 after processing is completed. A variety of mechanisms are known for managing data movement between storage 1112 and the integrated circuit memory element 1110, and the disclosure is not limited thereto. The disclosure is not limited to a particular memory system 1110 or a storage system 1112.

The system 1100 may include a computer platform that is programmable using a high-level computer programming language. The system 1100 may be also implemented using specially programmed, special purpose hardware, e.g. an ASIC. The system 1100 may include a processor 1106, which may be a commercially available processor such as the well-known Pentium class processor available from the Intel Corporation. Many other processors are available. The processor 1106 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A power device comprising:
   an input configured to be coupled to an AC power source and to receive input AC power from the AC power source;
   power circuitry coupled to the input;
   a plurality of outlets each configured to provide output AC power to a load derived from the input AC power;
   a network module configured to be coupled to a network;
   a controller coupled to the plurality of outlets, the power circuitry and the network module, the controller configured to:
   operate the power circuitry to provide a portion of the input AC power to each one of the plurality of outlets;
   provide a management interface to a management system via the network module and the network, the management interface configured to allow an operator to provide an indication of whether a first outlet of the plurality of outlets is coupled to a network based piece of equipment or a non-network based piece of equipment;
   determine, based on the indication, whether the first outlet of the plurality of outlets is coupled to a network based piece of equipment or a non-network based piece of equipment;

display via the management interface, in response to determining that the first outlet of the plurality of outlets is coupled to a network based piece of equipment, a first functionality option appropriate for a network based piece of equipment; and display via the management interface, in response to determining that the first outlet of the plurality of outlets is coupled to a non-network based piece of equipment, a second functionality option appropriate for a non-network based piece of equipment.

2. The power device of claim 1, wherein, in response to determining that the first outlet of the plurality of outlets is coupled to a network based piece of equipment, the controller is further configured to hide, via the management interface, the second functionality option appropriate for a non-network based piece of equipment.

3. The power device of claim 2, wherein, in response to determining that the first outlet of the plurality of outlets is coupled to a network based piece of equipment, the controller is further configured to reject control signals, with respect to the first outlet of the plurality of outlets, that correspond to the second functionality option.

4. The power device of claim 3, wherein, in response to determining that the first outlet of the plurality of outlets is coupled to a non-network based piece of equipment, the controller is further configured to:
  hide, via the management interface, the first functionality option appropriate for a network based piece of equipment; and
  reject control signals, with respect to the first outlet of the plurality of outlets, that correspond to the first functionality option.

5. The power device of claim 4, wherein displaying the first functionality option appropriate for a network based piece of equipment further involves displaying a graphical representation of the first functionality option in a layout; and wherein displaying the second functionality option appropriate for a non-network based piece of equipment further involves displaying a graphical representation of the second functionality option in the layout.

6. The power device of claim 5, wherein the first functionality option includes a rebooting feature implementation option and in response to the operator selecting, via the management interface, the rebooting feature implementation option with respect to the first outlet of the plurality of outlets, the controller is further configured to:
  periodically check the status of the network; and
  in response to a determination that the network has failed, operate the first outlet of the plurality of outlets to cycle power to a network based piece of equipment.

7. The power device of claim 6, wherein in periodically checking the status of the network, the controller is configured to:
  attempt to communicate with at least one server via the network; and
  in response to a determination that communication with the at least one server has failed, identify that the network as failed.

8. The power device of claim 7, wherein in attempting to communicate with the at least one server via the network, the controller is further configured to:
  attempt to communicate with a primary server via the network;
  in response to a determination that communication with the primary server has failed, attempt to communicate with a secondary server via the network; and
  in response to a determination that communication with the secondary server has failed, identify that the network has failed.

9. The power device of claim 8, wherein in response to the operator selecting, via the management interface, the rebooting feature implementation option for the first outlet of the plurality of outlets, the controller is further configured to provide, via the management interface, a reboot control option, and
  wherein in response to the operator selecting, via the management interface, the reboot control option, the controller is further configured to operate the first outlet of the plurality of outlets to cycle power to a network based piece of equipment.

10. The power device of claim 6, wherein the second functionality option includes a timer feature implementation option and in response to the operator selecting, via the management interface, the timer feature implementation option with respect to the first outlet of the plurality of outlets, the controller is further configured to alternate an operational state of the first outlet of the plurality of outlets during a scheduled period of time.

11. The power device of claim 10, wherein the controller is further configured to receive from the operator, via the management interface, the scheduled period of time.

12. The power device of claim 11, wherein in response to an indication that the first outlet of the plurality of outlets is coupled to a non-network based piece of equipment, the controller is further configured to provide, via the management interface, a representation of a power control option for the first outlet of the plurality of outlets, and
  wherein in response to the operator selecting, via the management interface, the power control option, the controller is further configured to alternate an operational state of the first outlet of the plurality of outlets.

13. The power device of claim 10, wherein the controller is further configured to receive from the operator, via the management interface, an indication to group the first outlet of the plurality of outlets with a second outlet of the plurality of outlets,
  wherein upon being grouped, the controller is further configured to identify the second outlet of the plurality of outlets as being coupled to the same type of equipment as the first outlet of the plurality of outlets and to provide, via the management interface, a representation of a same one of the first or second functionality option to the operator for the first outlet of the plurality of outlets and the second outlet of the plurality of outlets.

14. The power device of claim 13, wherein the second outlet of the plurality of outlets is a static outlet, and wherein the controller is further configured to permanently identify the static outlet as being coupled to a specific type of equipment and to permanently provide, via the management interface, one of the first and second functionality options to the operator with respect to the static outlet.

15. The power device of claim 1 further comprising a battery coupled to the power circuitry and configured to provide battery power to the power circuitry,
  wherein the controller is further configured to operate the power circuitry to provide the portion of the input AC power to the plurality of outlets derived from at least one of the input AC power and the battery power.

16. A method for operating a power device, the power device comprising a plurality of outlets each configured to provide output AC power derived from an input AC power source and a controller coupled to the plurality of outlets, the method comprising:

providing, by the controller, a management interface to an operator;

receiving, by the controller via the management interface, an indication of whether a first outlet of the plurality of outlets is coupled to a network based piece of equipment or is coupled to a non-network based piece of equipment;

determining, in response to receiving the indication, whether the first outlet of the plurality of outlets is coupled to a network based piece of equipment or is coupled to a non-network based piece of equipment;

displaying via the management interface, in response to determining that the first outlet of the plurality of outlets is coupled to a network based piece of equipment, a first functionality option appropriate for a network based piece of equipment; and displaying via the management interface, in response to determining that the first outlet of the plurality of outlets is coupled to a non-network based piece of equipment, a second functionality option appropriate for a non-network based piece of equipment.

17. The method of claim 16, further comprising:

hiding, via the management interface, in response to determining that the first outlet of the plurality of outlets is coupled to a network based piece of equipment, the second functionality option appropriate for a non-network based piece of equipment; and hiding, via the management interface, in response to determining that the first outlet of the plurality of outlets is coupled to a non-network based piece of equipment, the first functionality option appropriate for a network based piece of equipment.

18. The method of claim 17, wherein displaying the first functionality option appropriate for a network based piece of equipment further involves displaying a graphical representation of the first functionality option in a layout; and wherein displaying the second functionality option appropriate for a non-network based piece of equipment further involves displaying a graphical representation of the second functionality option in the layout.

19. The method of claim 18, further comprising:

blocking, with the controller, any control signals, corresponding to the second functionality option, for the first outlet of the plurality of outlets determined to be coupled to a network based piece of equipment; and blocking, with the controller, any control signals, corresponding to the first functionality option, for the first outlet of the plurality of outlets determined to be coupled to a non-network based piece of equipment.

20. The method of claim 19, wherein displaying the second functionality option includes displaying, via the management interface, a timer feature implementation option.

21. The method of claim 19, wherein displaying the first functionality option includes displaying, via the management interface, a rebooting feature implementation option.

22. The method of claim 21, further comprising:

periodically checking status of the network in response to the operator selecting the rebooting feature implementation option with respect to the first outlet of the plurality of outlets; and in response to a determination that the network has failed, operating the first outlet of the plurality of outlets to cycle power to a network based piece of equipment coupled to the first outlet of the plurality of outlets.

23. The method of claim 22, further comprising:

providing, in response to the operator selecting the rebooting feature implementation option with respect to a first outlet of the plurality of outlets, a reboot control option; and cycling power to a network based piece of equipment coupled to the first outlet of the plurality of outlets in response to the operator selecting the reboot control option.

24. The method of claim 21, further comprising alternating an operational state of a first outlet of the plurality of outlets during a scheduled period of time in response to the operator selecting the timer feature implementation option with respect to the first outlet of the plurality of outlets.

25. The method of claim 24, further comprising:

providing, via the management interface in response to determining that the first outlet of the plurality of outlets is coupled to a non-network based piece of equipment, a power control option with respect to the first outlet of the plurality of outlets; and alternating an operational state of the first outlet of the plurality of outlets in response to the operator selecting the power control option.

26. The method of claim 17, further comprising:

grouping the first outlet of the plurality of outlets with a second outlet of the plurality of outlets; and in response to grouping the first outlet of the plurality of outlets with the second outlet of the plurality of outlets, identifying the first outlet of the plurality of outlets as being coupled to a same type of equipment as the second outlet of the plurality of outlets and providing a same one of the first and second functionality options to both the first outlet of the plurality of outlets and the second outlet of the plurality of outlets.

* * * * *